United States Patent
Rhyu et al.

(10) Patent No.: US 10,498,785 B2
(45) Date of Patent: *Dec. 3, 2019

(54) APPARATUS AND METHOD FOR STORING AND PLAYING CONTENT IN A MULTIMEDIA STREAMING SYSTEM

(71) Applicants: Samsung Electronics Co., Ltd., Gyeonggi-do (KR); University of Seoul Industry Cooperation Foundation, Seoul (KR)

(72) Inventors: Sung-Ryeul Rhyu, Gyeonggi-do (KR); Yong-Han Kim, Gyeonggi-do (KR); Seo-Young Hwang, Gyeonggi-do (KR)

(73) Assignees: Samsung Electronics Co., Ltd (KR); University of Seoul Industry Cooperation Foundation (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/201,517

(22) Filed: Nov. 27, 2018

(65) Prior Publication Data

US 2019/0141102 A1 May 9, 2019

Related U.S. Application Data

(63) Continuation of application No. 15/494,978, filed on Apr. 24, 2017, now Pat. No. 10,148,715, which is a (Continued)

(30) Foreign Application Priority Data

Jan. 18, 2011 (KR) .................. 10-2011-0005054

(51) Int. Cl.
*H04L 29/06* (2006.01)
*H04N 21/61* (2011.01)
(Continued)

(52) U.S. Cl.
CPC .......... *H04L 65/4084* (2013.01); *H04L 67/02* (2013.01); *H04N 21/6125* (2013.01); *H04N 21/8456* (2013.01); *H04N 21/85406* (2013.01)

(58) Field of Classification Search
None
See application file for complete search history.

(56) References Cited

U.S. PATENT DOCUMENTS

| 5,758,174 A | * | 5/1998 | Crump | .................. | G06F 1/3203 |
| | | | | | 712/E9.032 |
| 5,959,690 A | * | 9/1999 | Toebes, VIII | ........ | G11B 27/105 |
| | | | | | 348/578 |

(Continued)

FOREIGN PATENT DOCUMENTS

| CN | 1559119 | 12/2004 |
| CN | 1764897 | 4/2006 |

(Continued)

OTHER PUBLICATIONS

European Search Report dated Dec. 21, 2018 issued in counterpart application No. 12736338.0-1209, 3 pages.

(Continued)

*Primary Examiner* — Younes Naji
(74) *Attorney, Agent, or Firm* — The Farrell Law Firm, P.C.

(57) ABSTRACT

Apparatus for transmitting media content in multimedia streaming system is provided. Apparatus includes a transceiver configured to receive a request for the media content; and transmit a plurality of segments regarding the media content, wherein the plurality of segments comprises an initialization segment (IS) and a media segment (MS), wherein the IS includes a moov box and a stsd box, wherein the stsd box includes sample description entries required to decode all representations within a representation group, and wherein each sample description entry in the stsd box (Continued)

corresponds to coding information of a media component in each of the representations, wherein the MS includes a moof box including a sample description index and a mdat box including media data, and wherein a value of the sample description index is an index of one of the sample description entries in the stsd box.

10 Claims, 14 Drawing Sheets

Related U.S. Application Data continuation of application No. 13/352,932, filed on Jan. 18, 2012, now Pat. No. 9,635,076.

(51) Int. Cl.
*H04N 21/845* (2011.01)
*H04N 21/854* (2011.01)
*H04L 29/08* (2006.01)

(56) References Cited

U.S. PATENT DOCUMENTS

| | | | |
|---|---|---|---|
| 7,263,497 B1* | 8/2007 | Wiser | G06Q 20/3829 705/26.8 |
| 7,817,903 B2 | 10/2010 | Suneya | |
| 2002/0105951 A1 | 8/2002 | Hannuksela et al. | |
| 2003/0061369 A1 | 3/2003 | Aksu et al. | |
| 2003/0188182 A1 | 10/2003 | Sato et al. | |
| 2006/0053366 A1* | 3/2006 | Abe | G06F 17/2211 715/234 |
| 2006/0230170 A1 | 10/2006 | Chintala et al. | |
| 2006/0242153 A1 | 10/2006 | Newberry et al. | |
| 2007/0100891 A1* | 5/2007 | Nee | G11B 27/034 |
| 2008/0270913 A1* | 10/2008 | Singer | G06F 15/16 715/748 |
| 2009/0228601 A1* | 9/2009 | Tseng | H04N 19/70 709/231 |
| 2010/0074601 A1* | 3/2010 | Murakami | G11B 27/105 386/241 |
| 2010/0124207 A1* | 5/2010 | Ghanadan | H04W 74/02 370/336 |
| 2010/0185854 A1 | 7/2010 | Burns et al. | |
| 2011/0096828 A1 | 4/2011 | Chen et al. | |
| 2011/0099270 A1* | 4/2011 | Hartman | H04M 1/2745 709/224 |
| 2011/0239078 A1* | 9/2011 | Luby | H04N 21/23106 714/752 |
| 2012/0102078 A1* | 4/2012 | Flick | G06F 16/68 707/825 |
| 2012/0110120 A1* | 5/2012 | Willig | H04L 65/1016 709/217 |
| 2012/0233345 A1* | 9/2012 | Hannuksela | H04N 21/26258 709/231 |
| 2013/0007109 A1* | 1/2013 | Matsuhira | H04L 67/1002 709/203 |
| 2013/0185756 A1* | 7/2013 | Frojdh | H04N 21/23439 725/88 |
| 2013/0191550 A1* | 7/2013 | Hannuksela | H04N 21/23432 709/231 |

FOREIGN PATENT DOCUMENTS

| | | |
|---|---|---|
| CN | 1868210 | 11/2006 |
| JP | 2007-012112 | 1/2007 |
| JP | 2007-324722 | 12/2007 |
| JP | 2008-005254 | 1/2008 |
| KR | 1020040025994 | 3/2004 |
| KR | 1020060111904 | 10/2006 |
| KR | 1020080048130 | 6/2008 |
| KR | 1020090044309 | 5/2009 |
| RU | 2 302 032 | 6/2007 |
| WO | WO 2011/038021 | 3/2011 |

OTHER PUBLICATIONS

3GPP TS 26.234 V9.3.0 (Jun. 2010) "Technical Specification Group Services and System Aspects; Transparent end-to-end Packet-switched Streaming Service (PSS); Protocols and codecs (Release 9)".
Information Technology—Multimedia Application Format (MPEG-A)—Part 9: Digital Multimedia Broadcasting Application Format, ISO/IEC 23000-9, First Edition, Aug. 15, 2008.
Information Technology—Coding of Audio-Visual Objects—Part 12: ISO Base Media File Format, ISO/IEC 14496-12, Third Edition, Oct. 15, 2008.
Information Technology—Coding of Audio-Visual Objects—Part 14: MP4 File Format, ISO-IEC 14496-14, First Edition, Nov. 15, 2003.
Information Technology—Coding of Audio-Visual Objects—Part 15: Advanced Video Coding (AVC) File Format, ISO/IEC 14496-15, First Edition, Apr. 15, 2004.
MPEG-B Systems, Text of ISO/IEC 23001-6: Dynamic Adaptive Streaming over HTTP (DASH), ISO/IEC JTC1/SC29/WG11, MPEG/N11578, Oct. 2010.
Ye-Kui Wang et al., "Report of DASH EE#9: Delivery Format to File Format Conversion (DFC)", ISO/IEC JTC1/SC29/WG11, MPEG2010/M18008, Sep. 2010.
Sungryeul Rhyu et al., "Response to Call for Proposals for HTTP Streaming of MPEG Media Standard", ISO/IEC JTCI/SC29/WG11, MPEG2010/M17779, Jul. 26, 2010.
Miska M. Hannuksela, "File Construction Instruction Format for DASH", ISO/IEC JTCI/SC29/WG11, MPEG2010/M18684, Dec. 3, 2010.
Miska M. Hannuksela, "Contribution to DASH EE#9: File Construction Instruction Format", ISO/IEC JTCI/SC29/WG11, MPEG2010/M18465, Oct. 28, 2010.
Ye-Kui Wang et al., "DASH Related Clarifications to ISO Base Media File Format", ISO/IEC JTCI/SC29/WG11, MPEG2010/M18309, Oct. 28, 2010.
International Standard, Information Technology—Coding of Audio Visual Objects—, Part 12: ISO Base Media File Format, ISO/IEC 14496-12, Jan. 1, 2005.
European Search Report dated Mar. 13, 2015 issued in counterpart application No. 12736338.0-1905.
Universal Mobile Telecommunications System (UMTS); LTE; Transparent end-to-end Packet-switched Streaming Service (PSS); Protocols and Codecs (3GPP TS 26.234 Version 9.3.0 Release 9), ETSI TS 126 234 V9.3.0, Jun. 2010, 185 pages.
Japanese Office Action dated Oct. 5, 2015 issued in counterpart application No. 2013-550401, 8 pages.
Australian Examination Report dated Sep. 30, 2015 issued in counterpart application No. 2012207773, 3 pages.
Chinese Office Action dated Feb. 2, 2016 issued in counterpart application No. 201280005690.9, 21 pages.
Notice of Acceptance dated Apr. 19, 2016 issued in counterpart application No. 2012207773, 3 pages.
Japanese Office Action dated Jun. 6, 2016 issued in counterpart application No. 2013-550401, 9 pages.
Korean Office Action dated Dec. 2, 2016 issued in counterpart application No. 10-2011-0005054, 10 pages.
Japanese Office Action dated Jan. 4, 2017 issued in counterpart application No. 2013-550401, 5 pages.
Korean Office Action dated Feb. 24, 2017 issued in counterpart application No. 10-2011-0005054, 4 pages.
Indian Examination Report dated Aug. 13, 2018 issued in counterpart application No. 2133/KOLNP/2013, 6 pages.

* cited by examiner

APPARATUS AND METHOD FOR STORING AND PLAYING CONTENT IN A MULTIMEDIA STREAMING SYSTEM

PRIORITY

This application is a Continuation Application of, and claims priority under 35 U.S.C. § 120 to U.S. patent application Ser. No. 15/494,978 filed in the U.S. Patent and Trademark Office on Apr. 24, 2017, which claims priority under 35 U.S.C. § 120 to U.S. patent application Ser. No. 13/352,932 filed in the U.S. Patent and Trademark Office on Jan. 18, 2012, now issued as U.S. Pat. No. 9,635,076 on Apr. 25, 2017, which claims priority under 35 U.S.C. § 119(a) to Korean Patent Application Serial No. 10-2011-0005054, which was filed in the Korean Intellectual Property Office on Jan. 18, 2011, the entire contents of each of which are incorporated herein by reference.

BACKGROUND

1. Field of the Disclosure

The present disclosure relates generally to a multimedia streaming system.

2. Description of the Related Art

An adaptive streaming technique named Dynamic Adaptive Streaming over HyperText Transfer Protocol (HTTP) (DASH) is currently being discussed by several standard setting organizations. DASH partitions multimedia content created in an International Organization for Standardization (ISO) base media file format or other file formats standardized based on the ISO base media file format, or multimedia content created as a Moving Picture Experts Group (MPEG)-2 Transport Stream (TS), into several files, i.e., into segments, and stores the segments to a HTTP server. Thereafter, clients can consecutively download the segments using HTTP to receive a multimedia content streaming service.

The content streamed using the above-described DASH technique conforms to the ISO base media file format or the MPEG-2 TS. Accordingly, consideration may be given to a service that stores the streamed content and plays the stored content in a corresponding receiving device or other device supporting the ISO format. However, because the content streamed on a segment basis is constituted based on transmission over a communication network, the content may not be seamlessly played when the streamed segments are stored intact. In particular, a typical player device not supporting the streaming service may not normally play the stored content. Hence, when generating the segment files for the DASH based streaming service, a need exists for an improved format for storing and playing segment files.

SUMMARY

The present disclosure is designed to substantially solve at least the above-described problems and/or disadvantages and to provide at least the advantages below.

Accordingly, an aspect of the present disclosure to provide an apparatus and a method for storing and playing content streamed in a multimedia streaming system.

Another aspect of the present disclosure is to provide an apparatus and a method for generating a content file that is playable by another device by sequentially concatenating DASH segments in a multimedia streaming system.

Another aspect of the present disclosure is to provide an apparatus and a method for indicating whether a media file that is playable by a legacy file player device may be generated by concatenating segments transmitted in a multimedia streaming system.

In accordance with an aspect of the present disclosure, an apparatus for transmitting media content in a multimedia streaming system is provided. The apparatus includes a transceiver configured to receive a request for the media content; and transmit a plurality of segments regarding the media content, wherein the plurality of segments comprises an initialization segment (IS) and a media segment (MS), wherein the IS includes a moov box and a stsd box, wherein the stsd box includes sample description entries required to decode all representations within a representation group, and wherein each sample description entry in the stsd box corresponds to coding information of a media component in each of the representations, wherein the MS includes a moof box including a sample description index and a mdat box including media data, and wherein a value of the sample description index is an index of one of the sample description entries in the stsd box.

In accordance with another aspect of the present disclosure, an apparatus for receiving a media content in a multimedia streaming system is provided. The apparatus includes a transceiver configured to transmit a request for the media content; and receive a plurality of segments regarding the media content, wherein the plurality of segments comprises an initialization segment (IS) and a media segment (MS), wherein the IS includes a moov box and a stsd box, wherein the stsd box includes sample description entries required to decode all representations within a representation group, and wherein each sample description entry in the stsd box corresponds to coding information of a media component in each of the representations, wherein the MS includes a moof box including a sample description index and a mdat box including media data, and wherein a value of the sample description index is an index of one of the sample description entries in the stsd box.

BRIEF DESCRIPTION OF THE DRAWINGS

The above and other aspects, features, and advantages of certain embodiments of the present disclosure will be more apparent from the following detailed description taken in conjunction with the accompanying drawings, in which.

Throughout the drawings, like reference numerals will be understood to refer to like parts, components, and structures.

DETAILED DESCRIPTION OF EMBODIMENTS OF THE PRESENT DISCLOSURE

Various embodiments of the present disclosure will be described herein below with reference to the accompanying drawings. In the following description, well-known functions or constructions are not described in detail to avoid obscuring the disclosure in unnecessary detail.

The description of the embodiments of the present disclosure below uses terms defined in the ISO standard and the DASH standard. However, the present disclosure is not limited to these terms, and is applicable to other standard systems.

Hereinafter, an entity for generating segment files for the streaming is referred to as "a segment generator", an entity for providing the segments over a communication network is referred to as "a DASH server", an entity for receiving the streamed segments over the communication network and generating a media file by concatenating the received segments is referred to as "a DASH client", and an external device for playing the media file generated by concatenating the segments is referred to as "a media player". Further, "a box" refers to a unit included in the media file. Descriptions of different types of boxes are shown in Table 1 below.

TABLE 1

| Box | Description |
| --- | --- |
| moov (movie) | container box including a track box and whose sub-boxes define a metadata for a presentation. |
| moof (movie fragment) | A box that includes a metadata for an mdat box. |
| ftyp (file type) | A box that includes brand information of a media file. |
| mdat (media data container) | A box that may hold the actual media data for a media component (i.e., audio, video). |
| styp (segment type) | A box that includes information on transmitted segments. |
| stsd (sample description) | A box that includes a sample description for a media component. |
| tfhd (track fragment header) | A box that includes a metadata for a track fragment. |

A DASH client for receiving the streaming service downloads a control information segment, i.e., a Media Presentation Description (MPD), before downloading a segment including media. The MPD includes a Uniform Resource Locator (URL) of segments to download, information about an order for downloading the segments to generate an effective content presentation, and control information for adaptively controlling the download based on network conditions.

Figure 1:
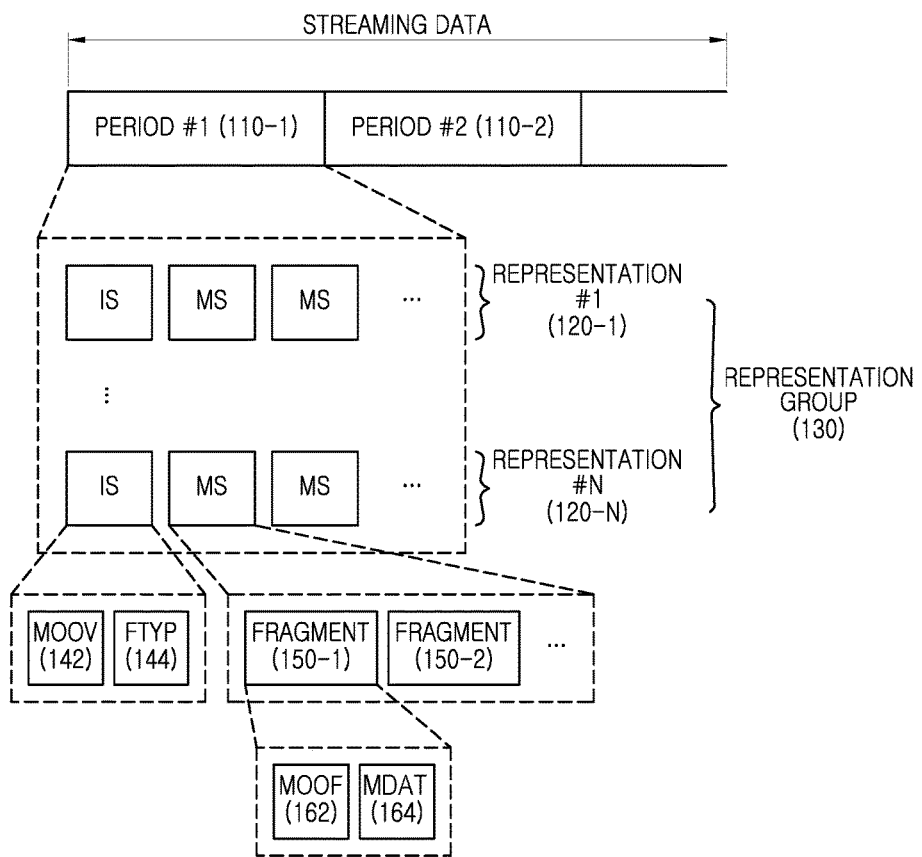
FIG. 1 illustrates a streaming data structure in a multimedia streaming system according to an embodiment of the present disclosure.

FIG. 1 illustrates a streaming data structure in a multimedia streaming system according to an embodiment of the present disclosure.

Referring to FIG. 1, the content in an ISO base media file format stored in a DASH server is logically split the time axis and be partitioned into several periods 110-1 and 110-2 corresponding to the time intervals. The periods 110-1 and 110-2 each include an Initialization Segment (IS) and Media Segments (MSs). The IS includes metadata of the media data, which may be divided into media components, e.g., into an audio component or a video component. The IS also includes metadata of the media component in a track box for each media component. Basically, the metadata includes information that is irrelevant to the media data length. That is, the metadata includes a coding method of the media component such as audio and video, but does not include information that may be written only by knowing the content length.

Each period may include one IS and a plurality of representations replaceable to adaptively control the streaming according to the network condition. The replaceable representations belong to a same representation group. The representations each may include one IS and a plurality of MS files. Hence, the DASH client may download MS files by selecting only one of the representations of the same representations group.

For example, as illustrated in FIG. 1, when the representations 120-1 to 120-N in the same representation group 130 may be switched, the DASH client may download and present one MS from the first representation 120-1 and the next MS from the N-th representation 120-N in the same representation group 130. An MS file may include media component data. For example, a particular representation may include only an audio component. In this case, the MS of this representation includes only the audio. By contrast, when a particular representation includes audio and the video components, its MS likewise includes both the audio and the video.

The IS in representation 120-N includes a moov box 142 and an ftyp box 144 as defined in the ISO base media file format. According to the DASH standard, a 'major brand' field value of the ftyp box 144 of the IS records a value indicating 'dash'. For example, the value including 'dash' may include "dash".

An MS file may include one or more media component data. For example, in FIG. 1, an MS file representation 120-N includes a plurality of fragments 150-1 and 150-2, where fragment 150-1 includes a moof box 162 and an mdat box 164. The moof box 164 includes metadata of one media component. The metadata locates media data chunks in the mdat box 164 containing the actual media data. The mdat box 164 includes the actual media data of one media component. The media data may be contained on the sample basis. Herein, in the video, the sample indicates data of a compressed frame. When representation 120-N includes a plurality of media components, part of the fragments 150-1 and 150-2 of the MS of the representation 120-N may include video data (e.g., fragment 150-1) and part of the fragments 150-1 and 150-2 may include audio data (e.g., fragment 150-1). That is, because one moof box 162 and one mdat 164 include only one media component, the media components in an MS may be divided on the fragment basis.

To concatenate the DASH segments and store them as a playable media file, configuration methods according to an embodiment of the present disclosure are required.

A configuration feature is that the brand value of the legacy file is sustained.

A file (e.g., MP4, AVC1, etc.) of the ISO base media file format or the file formats standardized based on the ISO base media file format includes the ftyp box. The ftyp box includes a 'major_brand' field, a 'minor_version' field, and a 'compatible_brand" field. The 'major_brand' field includes a value. By contrast, the ftyp box of the IS of the DASH segment file may set the 'major_brand' value to the value indicating 'dash', for example, to "dash". It is specified that the "dash" brand conforms to a dash profile of the ISO base media file format. However, the media player supporting only the existing ISO base media file format may not interpret the dash profile. Therefore, the brand name interpretable by the legacy media player should be contained in a particular field of the ftyp box so that the media player may play the stored media file including the DASH segment. For example, the particular field may be the 'compatible_brand' field.

When transmitting a content file of a new file format defined based on the ISO base media file format, for example, of standard file formats, such as Digital Media Broadcasting Application Format (DMB AF), corresponding to MPEG-A, as the DASH segment, the DASH server may record the brand of the 'major_brand' field of the ftyp box of the media file corresponding to the raw material, into the 'compatible_brand' field, and record the value indicating 'dash' in the 'major_brand' field. Accordingly, when the DASH client generates the media file by concatenating the IS and the MSs, the media player recognizes "dash" as the major brand and recognizes the major brand of the raw media file as one of the compatible brands. Because the media player may not recognize the "dash" brand, it determines the major brand of the media file as the unknown brand. Thus, the media player plays the media file by selecting an optimum brand interpretable by itself from among compatible brands. For example, the optimum brand may be the most complex brand. However, because the optimum brand may be played but may not be the major brand of the raw media file, it may cause a problem in the file management. That is, although the optimum file is the effective file for the major brand, there is currently no way to express this and thus problems may be caused in the file management.

The DASH specification defines the styp box and defines to selectively include the styp box in a first part of the MS. The styp box indicates the brand of the DASH MS. The media player ignores the unrecognized box. Even when the MSs including the styp box are concatenated, the effective media file playable by the media player may be generated.

To sustain the major brand of the raw media file, even in a media file generated by concatenating segments, the first part of the IS may include the styp box. That is, the segment generator records the value indicating 'dash' in the styp box of the first part of the IS and sets the fields of the ftyp box according to the raw media file without modifications. Thus, when the DASH client concatenates and stores the IS and the MSs, the media player may accurately obtain the information including the major brand from the corresponding media file. The media player ignores both of the styp box in the first part of the IS and the styp box in the first part of the MS.

To generate a media file playable by a legacy file player by concatenating an IS and MSs received in one period, a segment generator should satisfy the conditions set forth below, when generating the IS and the MS. The DASH client switches to different representations of the same representation group to change the transfer rate according to the network condition and downloads the MSs of the corresponding representation. Thus, the conditions are defined based on this point.

The conditions (1)-(7) are described below.

Condition (1): Track information of every media component belonging to the same period is contained in a first box of the IS.

For example, the first box may be the moov box. That is, one period may include one common IS for all the representations of the period.

For example, the track information may include information of a track type (e.g., audio or video), a track number, a codec used, the number of samples, and a presentation time of each sample. Basically, the IS includes all of the sample descriptions required to decode all of the representations within a representation group.

Condition (2): Every track includes unique track ID.

Different media components do not have the same track ID.

Condition (3): A Track ID recorded in a second box of the MS of all the representations of the same representation group has the same value as a track ID of a corresponding media component track in the first box of the IS corresponding to the representations.

For example, the second box may be the moof box, and the first box may be the moov box. That is, the track IDs for the same media content component are identical for each representation in each representation group. Herein, the representation group may be referred as 'an adaptation set'.

For example, the track ID of the audio track recorded in the moof box is identical to the track ID of the audio track in the moov box. For any particular media component, all track fragments in media segments within a same representation group in the period shall have the same value of track ID in a tthd box of a traf box of a moof box as that of the media component track in the moov box in the Initialization Segment.

Condition (4): Sample description for the representations of different encoding within the same representation group is contained in the first box. That is, the IS shall include all the sample descriptions required to decode all the representations within the representation group.

For example, the first box may be the moov box, and the sample description is contained in the stsd box of the corresponding media component in the moov box. That is, sample description entries of the representations are contained in the stsd box of the IS. Basically, each sample entry in the stsd box corresponds to the coding information of the media component in each representation.

For example, when the number of representations including the audio track is N, all of the sample descriptions of the N-ary representations are contained in the moov box. Specifically, the moov box includes the N-ary sample description entries, i.e., the track box includes all the different coding information for all the different representations in the stsd box.

Condition (5): A sample description index in the tfhd box of every track fragment of the MS designates one, which corresponds to the representation, of the sample description entries in the stsd box.

The value of sample description index in tfhd box in a track fragment of a media component shall be the index of the corresponding sample entry in the stsd box of the media component track.

Condition (6): A media data address in the second box is a relative address, rather than an absolute address.

For example, the second box may be the moof box, i.e., the address for locating the media data in the mdat box is a relative address. The relative address may be byte offsets based on the location of the moof box, and the moof boxes shall use movie-fragment relative addressing.

Condition (7): The first part of the IS includes the styp box, and the value indicating 'dash' is recorded in the styp box. In addition, to show the value indicating 'dash', the first part of the MS may also include the styp box.

For example, each MS may contain a styp box and if present shall carry a value indicating 'dash' as a compatible brand.

Another configuration feature is that an MPD may be used to indicate that the media file playable by the media file player may be generated by concatenating the segments.

The DASH server indicate that the media file playable by the media file player may be generated by concatenating the segments transmitted by adding a particular flag on a period level in the MPD. Hereafter, the flag is referred to as "a compatible flag". When the compatible flag is set to 1, this indicates that the media file generated by concatenating the different representation segments in the same representation group transmitted in the corresponding period may be played by the media file player.

As described above, the concatenation of an IS with all consecutive MSs of a single representation within a period, starting with the first MS, results in a syntactically valid bit stream (according to the specific bitstream format) that is also semantically correct (i.e., if the concatenation is played, the media content within this period is correctly presented). When 'bitstreamSwitchingFlag' is set to 'true', consecutive segments following the same constraints may come from any representation within the same group within this period and a legacy media player presents the media content within this period correctly if it plays the brute-force concatenation of all the segments possibly from different representations including an Initialization Segment, if present.

Although the segment generator and the DASH server are described as separate components below, the segment generator may be included in the DASH server in various implementations.

Figure 2:
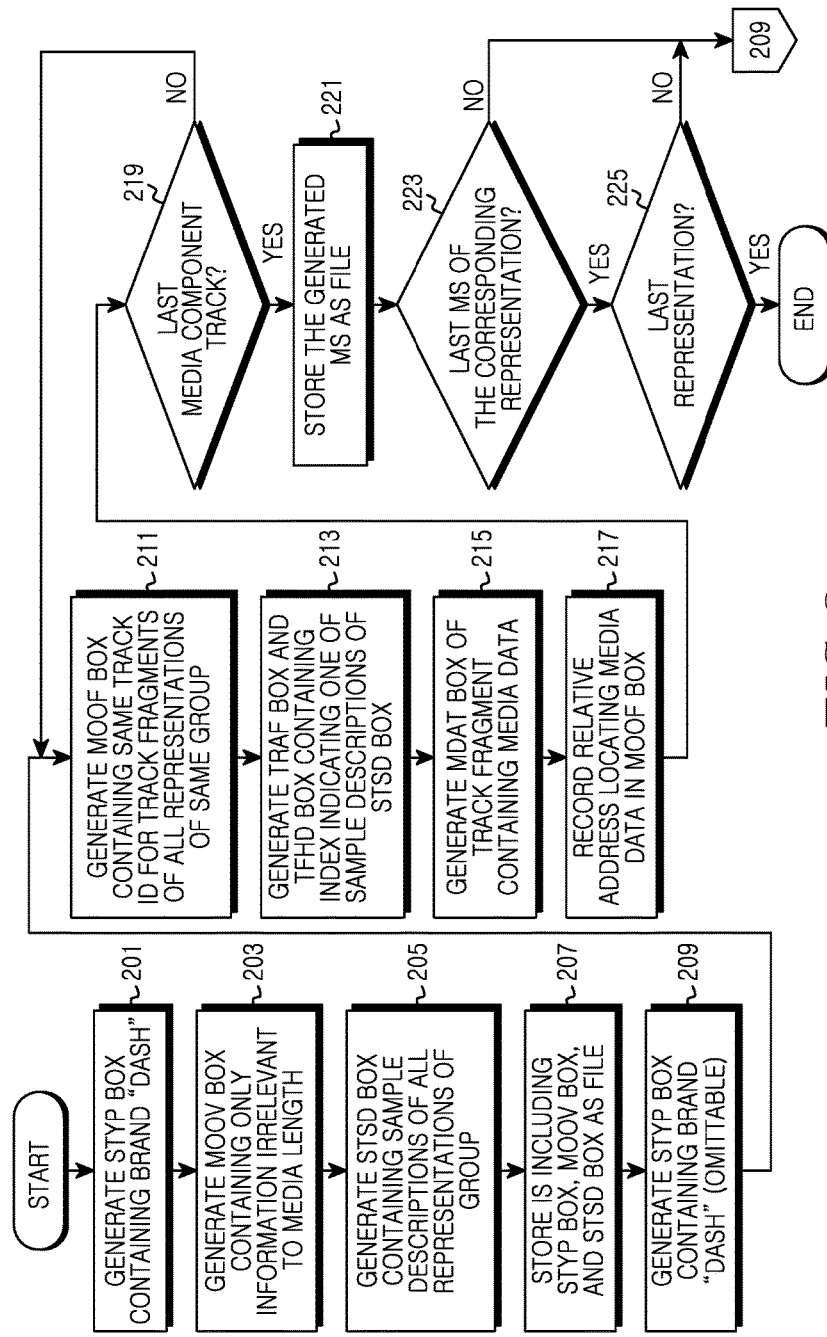
FIG. 2 is a flowchart illustrating operations of a segment generator in a multimedia streaming system according to an embodiment of the present disclosure.

FIG. 2 is a flowchart illustrating operations of a segment generator in a multimedia streaming system according to an embodiment of the present disclosure.

Referring to FIG. 2, in steps 201 through 207, the segment generator generates the IS file. More specifically, the segment generator generates a styp box indicating the "dash" brand in step 201. For example, the segment generator sets the value of the 'major_brand' field in the styp box, to the value indicating the 'dash'.

In step 203, the segment generator generates the first box including only information that is irrelevant to the media length. For example, the first box may be the moov box. That is, the segment generator includes the metadata of the media in the moov box and the decoding method of each media component such as audio and video, and excludes the information that may be recorded only when knowing the content length. For example, the moov box may include information of the track type (e.g., audio and audio), the track number, the used codec, the number of the samples, the presentation time of each sample, etc.

In step 205, the segment generator includes the sample description of all the representations of the group in the first box. For example, the segment generator generates the stsd box including the sample description of all the representations of the group. The stsd box is included in the moov box and may contain the sample description.

In accordance with an embodiment of the present disclosure, the IS includes the stsd box containing the sample description of all of the representations. Accordingly, the IS may function as a common IS for all of the representations in the representation group for the corresponding period. For example, the sample description may include information of video width/length size information, audio sampling rate, media compression coding condition, etc.

In step 207, the segment generator stores the IS including the styp box, the moov box, and the stsd box, as the file. Accordingly, the segment generator includes the ftyp box of the raw media file in the IS. For example, the IS file may be the common IS relating to the plurality of the representations.

The segment generator generates at least one MS file in steps 209 to 225.

More specifically, the segment generator generates the styp box including the value indicating 'dash' in step 209. In other implementations, step 209 may be omitted. That is, the MS might not include the styp box.

In step 211, the segment generator generates the moof box including the same track ID for the track fragments of all of the representations of the same group. The segment generator sets the same track ID of the moof box as the track ID of the moov box of the IS.

In step 213, the segment generator generates the traf box and the tfhd box of the track fragment. The tfhd box is included in the traf box and contains information of the track fragment. For example, the tfhd box may contain the index of the sample description. Accordingly, the segment generator identifies the sample description of the corresponding representation of the tfhd box among the sample descriptions of all of the representations of the stsd box of the IS, and then includes the index of the corresponding sample description to the tfhd box.

In step 215, the segment generator generates the mdat box including the track fragment of the media data. The segment generator may include the fragment in the mdat box so that each fragment begins with a Random Access Point (RAP) sample and has the same playback time. It is advantageous that the mdat box in the MS of the same representation includes the same media component.

In step 217, the segment generator records the relative address locating the media data in the moof box, i.e., the moof box includes addresses of the media data chunks of the mdat box. The segment generator uses the relative addressing, not the absolute addressing. For example, the relative address may be the byte offsets based on the location of the moof box.

Basically, in the above-described steps 211 through 217, one moof box and one mdat box are generated, which contain only one media component. Accordingly, when an MS includes a plurality of media components, steps 211 through 217 are repeated.

Therefore, in step 219, the segment generator determines whether the last media component track is generated. When the last media component track is not generated, the operation returns to step 211. However, when the last media component track is generated, the segment generator stores the MS including the moof box and the mdat box, as the file in step 221.

In step 223, the segment generator determines whether the last MS of the corresponding representation is completely stored. When the last MS is not completely stored, the operation returns to step 209. However, when the last MS is completely stored, the segment generator determines whether the MS files of the last representation are completely stored in step 225.

When the MS files of the last representation are not completely stored, the operation returns to step 209. However, when the MS files of the last representation are completely stored, the segment generator finishes the segment file generation process of the corresponding period.

Figure 3:
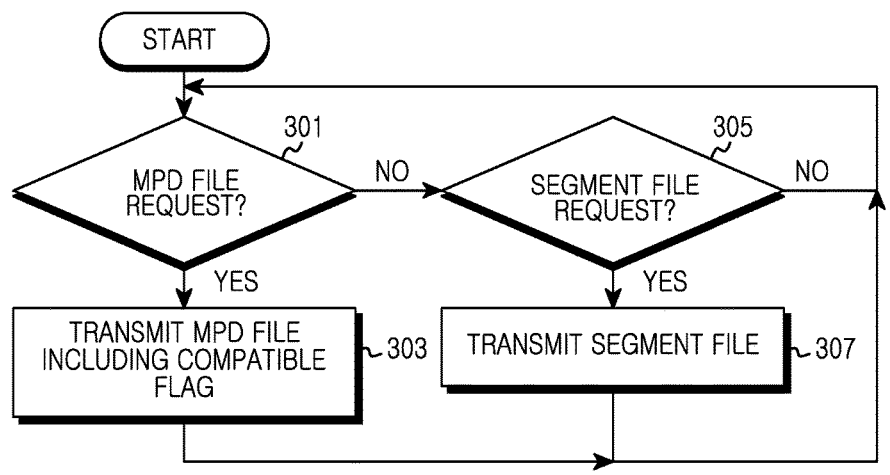
FIG. 3 is a flowchart illustrating operations of a Dynamic Adaptive Streaming over HyperText Transfer Protocol (HTTP) (DASH) server in a multimedia streaming system according to an embodiment of the present disclosure.

FIG. 3 is a flowchart illustrating operations of a DASH server in a multimedia streaming system according to an embodiment of the present disclosure.

Referring to FIG. 3, in step 301, the DASH server determines whether a transmission request of the MPD file occurs. That is, the DASH server determines whether the MPD file transmission is requested by the DASH client through HTTP.

When the transmission request of the MPD file occurs, the DASH server transmits the requested MPD file in step 303.

In accordance with an embodiment of the present disclosure, the MPD file includes a compatible flag indicating whether a media file that is playable by a media file player may be generated by concatenating the transmitted segments. Accordingly, the DASH server transmits the MPD file including the compatible flag to the DASH client.

When the transmission request of the MPD file does not occur, the DASH server determines whether the transmission of the segment file is requested in step 305. That is, the DASH server determines whether the segment file transmission is requested by the DASH client through the HTTP. When the segment file transmission is requested, the DASH server transmits the requested segment file in step 307.

Figure 4A:
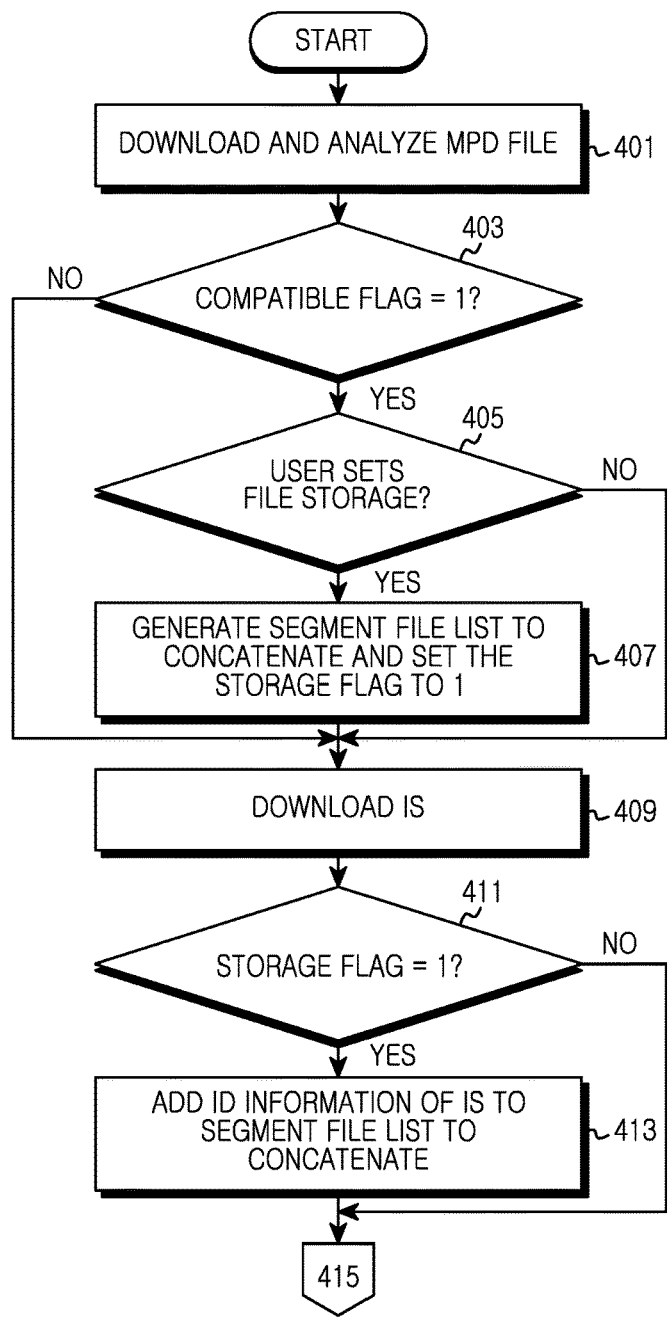
FIGS. 4A and 4B are flowcharts illustrating operations of a DASH client in a multimedia streaming system according to an embodiment of the present disclosure.
Figure 4B:
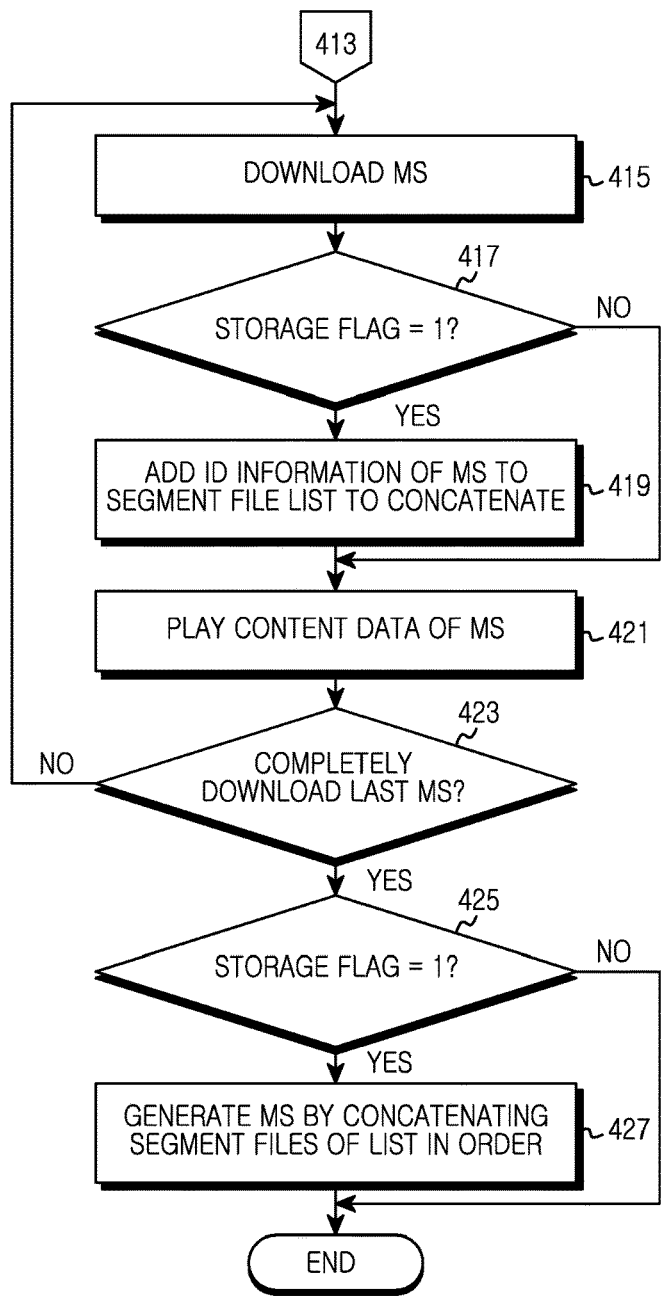

FIGS. 4A and 4B are flowcharts illustrating operations of a DASH client in a multimedia streaming system according to an embodiment of the present disclosure.

Referring to FIGS. 4A and 4B, the DASH client downloads and analyzes an MPD file in step 401. That is, the DASH client requests the MPD file, receives the MPD file, and then confirms information for downloading the segment in the MPD file.

In an accordance with an embodiment of the present disclosure, the MPD file includes a compatible flag indicating whether a media file that is playable by a media file player may be generated by concatenating the transmitted segments.

In step 403, the DASH client determines whether the compatible flag is set to 1, i.e., the value indicating whether a media file that is playable by a media file player may be generated by concatenating the segments. When the compatible flag is not set to 1, the operation goes directly to step 409.

However, when the compatible flag is set to 1, the DASH client determines whether the user sets the file storage in step 405. That is, the DASH client determines whether the user wants to store the media file by concatenating the segments. Although not illustrated in FIGS. 4A and 4B, the DASH client may display a screen inquiring about whether to concatenate the segments to the user and confirm the user's input.

When the file storage is not set, the operation goes to step 409.

However, when the file storage is set, the DASH client generates a segment file list to concatenate and sets the storage flag to 1 in step 407, thereby initializing the segment file list to concatenate. At this time, the segment file list to concatenate does not include the information of the segment file. The storage flag indicates that the file storage is set, and is used to determine whether to include the ID information of the segment files received in the subsequent steps into the file list.

In step 409, the DASH client downloads the IS. Specifically, the DASH client requests the IS file using the information in the MPD file and receives the IS file. In accordance with an embodiment of the present disclosure, the IS may include at least one of the styp box containing the value indicating 'dash' and the stsd box containing the sample descriptions of all the representations of the representation group.

In step 411, the DASH client checks whether the storage flag is set to 1. When the storage flag is not set to 1, the operation goes to step 415. However, when the storage flag is set to 1, the DASH client adds the ID information of the downloaded IS into the segment file list to concatenate in step 413.

In step 415, the DASH client downloads the MS by requesting the MS file using the information in the MPD file and then receiving the MS file. Accordingly, the DASH client selects the transfer rate to apply by considering the network condition and downloads the MS file of the representation corresponding to the selected transfer rate.

After receiving the MS, the DASH client determines whether the storage flag is set to 1 in step 417. When the storage flag is set to 1, the DASH client adds the ID information of the downloaded MS into the segment file list to concatenate in step 419.

When the storage flag is not set to 1 or after adding the ID information of the downloaded MS into the segment file list to concatenate in step 419, the DASH client plays the content data in step 421. In step 423, the DASH client determines whether the download of the last MS is completed, i.e., the DASH client determines whether all of the MSs within the corresponding period are downloaded. When the download of the last MS is not completed, the operation returns to step 415.

However, when the download of the last MS is completed, the DASH client determines whether the storage flag is set to 1 in step 425. When the storage flag is set to 1, the DASH client generates the media file by concatenating the segment files of the file list in the order of the list in step 427. However, when the storage flag is not set to 1, the operation ends.

Figure 5:
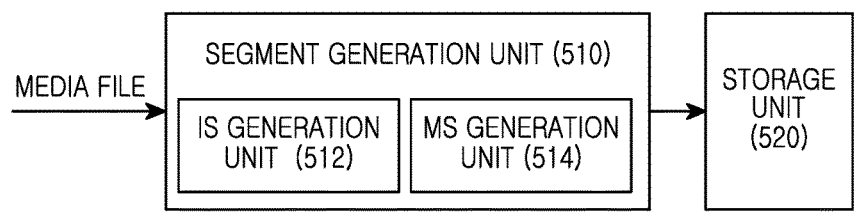
FIG. 5 illustrates a segment generator of a multimedia streaming system according to an embodiment of the present disclosure.

FIG. 5 illustrates a segment generator of a multimedia streaming system according to an embodiment of the present disclosure.

Referring to FIG. 5, the segment generator includes a segment generation unit 510 and a storage unit 520.

The segment generation unit 510 generates the segment files from the media file to stream the media file over the communication network according to DASH. The segment generation unit 510 include an IS generation unit 512 for generating the IS and an MS generation unit 514 for generating the MS. The storage unit 520 stores the segments generated by the segment generation unit 510.

Specifically, the IS generation unit 512 and the MS generation unit 514 generate the segments to create the media file that is playable by the media file player by concatenating the segments. For example, the IS generation unit 512 and the MS generation unit 514 generate the segments as illustrated in FIG. 2 and described above.

More specifically, the IS generation unit 512 generates the styp box including the value indicating 'dash', generates the moov box including information irrelevant to the media length, and generates the stsd box including the sample descriptions of all the representations of the group. The IS generation unit 512 stores the IS including the styp box, the moov box, and the stsd box, as the file. Accordingly, the IS generation unit 512 includes the ftyp box of the raw media file intact into the IS, without any modifications.

The MS generation unit 514 generates the styp box including the value indicating 'dash'. Alternatively, the generation of the styp box may be excluded.

The MS generation unit 514 generates the moof box including the same track ID for the track fragment for all of the representations of the same group, generates the tfhd box including the index of the sample descriptions of the representation corresponding to the tfhd box among the sample description of all of the representations in the stsd box of the IS, generates the mdat box including the track fragment of the media data, and records the relative address of the media data location in the moof box. For example, the relative address may be a byte offset based on a location of the moof box.

Herein, the MS generation unit 516 sets the same track ID of the moof box as the track ID of the moov box of the IS. The MS generation unit 514 includes the same media component in the mdat box of the MS of the same representation.

Figure 6:
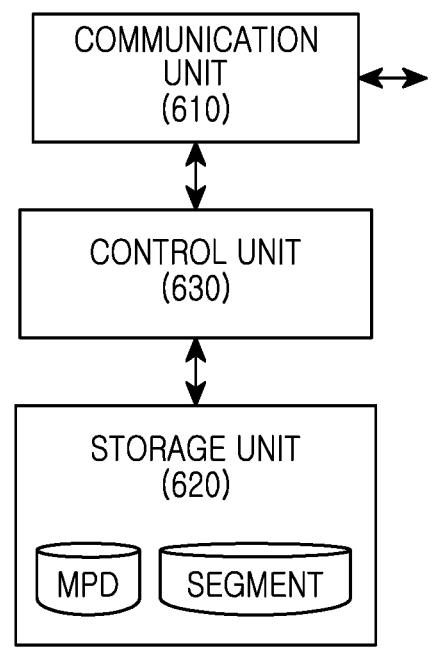
FIG. 6 illustrates a DASH server of a multimedia streaming system according to an embodiment of the present disclosure.

FIG. 6 illustrates a DASH server of a multimedia streaming system according to an embodiment of the present disclosure.

Referring to FIG. 6, the DASH server includes a communication unit 610, a storage unit 620, and a control unit 630.

The communication unit 610 provides an interface to communicate with other entities in the network. The storage unit 620 stores a basic program for operating the DASH server, e.g., the storage unit 620 stores media content to be provided to the DAS clients, as the segments, and stores the MPD file including the information for downloading the segment.

The control unit 630 controls the functions of the DASH server.

For example, according to the request of the DASH client, the control unit 630 transmits the MPD file and the segment file to the DASH client through the communication unit 610. Specifically, the control unit 630 transmits the MPD file including the compatible flag, which indicates whether the media file that is playable by the media file player may be generated by concatenating the transmitted segments.

Figure 7:
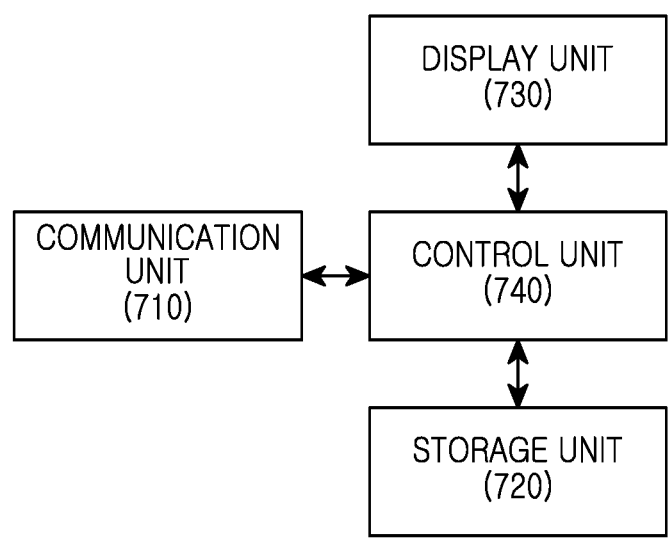
FIG. 7 illustrates a DASH client in a multimedia streaming system according to an embodiment of the present disclosure.

FIG. 7 illustrates a DASH client in a multimedia streaming system according to an embodiment of the present disclosure.

Referring to FIG. 7, the DASH client includes a communication unit 710, a storage unit 720, a display unit 730, and a control unit 740.

The communication unit 710 restores data from a signal received in a channel, converts the transmit data to a signal, and transmits the signal over the channel. Herein, the channel may be a wired channel or a radio channel. As for the radio channel, the communication unit 710 converts a Radio Frequency (RF) signal received via an antenna to a baseband signal, processes the baseband signal in the physical layer according to a standard of a communication system, and recovers the bit stream using demodulation.

The storage unit 720 stores a basic program for operating the DASH client, configuration information required for the communication, and a program and setup information for the user interface. The storage unit 720 provides the stored data under the control of the control unit 740. The display unit 730 displays status information during the operation of the DASH client, and numbers, characters, and images according to the execution of an application program.

For example, the display unit 740 displays video content, i.e., video data output from the control unit 740, on a visual screen. For example, the display unit 740 may be a Liquid Crystal Display (LCD), an Organic Light-Emitting Diode (OLED), etc.

The control unit 740 controls the functions of the DASH client. For example, the control unit 740 generates the image data from the data received through the communication unit 710, i.e., from the MS file, and provides the image data to the display unit 730. Specifically, the control unit 740 controls the generation of the media file that is playable by the media file player by concatenating the segments. For example, the control unit 740 controls the DASH client to operate as illustrated in FIGS. 4A and 4B.

More specifically, the control unit 740 downloads the MPD file and determines whether the compatible flag in the MPD file is set to 1. When the compatible flag is 1 and the user sets the file storage, the control unit 740 generates the segment file list to concatenate and sets the storage flag to 1. Thereafter, the control unit 740 downloads the IS file and the MS files using the information in the MPD file.

Accordingly, the control unit 740 stores the ID information of the downloaded segment files in the segment file list to concatenate. When the segments in one period are completely downloaded, the control unit 740 generates the media file by concatenating the segment files of the file list in the order of the list.

According to an embodiment of the present disclosure, a concatenated media file may be generated as described below.

In the description below, two different representations are provided, i.e., a first representation and a second representation, where the first representation and the second representation each include video and audio, the video being encoded at 500 kbps and 100 kbps, the audio being encoded at 96 kbps, the total playback duration being 60 seconds, and the playback duration of each MS file being 5 seconds. Accordingly, each representation includes 12 MSs, where an MS may include 10 or 20 fragments.

For example, when the fragment includes audio and video, an MS may include 10 fragments. When the fragment includes either audio or video, an MS may include 20 fragments. Accordingly, the playback duration of a fragment is 0.5 second. The first sample in a fragment is the RAP.

Figure 8:
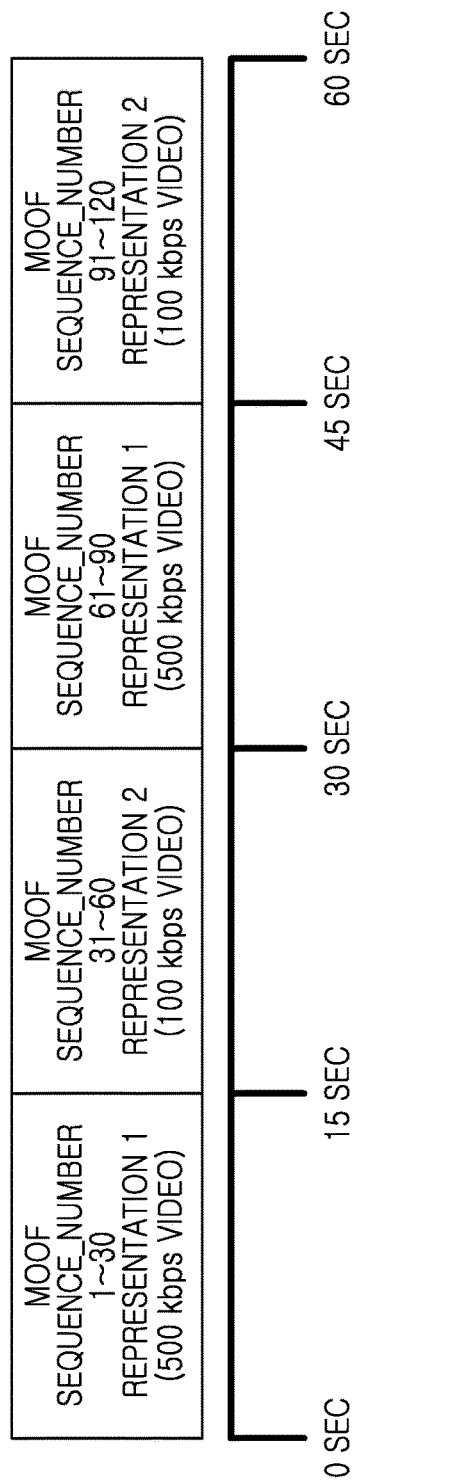
FIG. 8 illustrates a receive stream in a multimedia streaming system according to an embodiment of the present disclosure.

FIG. 8 illustrates a receive stream in a multimedia streaming system according to an embodiment of the present disclosure.

Referring to FIG. 8, the switching takes place at 15 seconds, 30 seconds, and 45 seconds. Thus, segments of the first representation are received in 0-15 seconds, segments of the second representation are received in 15-30 seconds, segments of the first representation are received in 30-45 seconds, and segments of the second representation are received in 45-60 seconds.

Figures 9A, 9B:
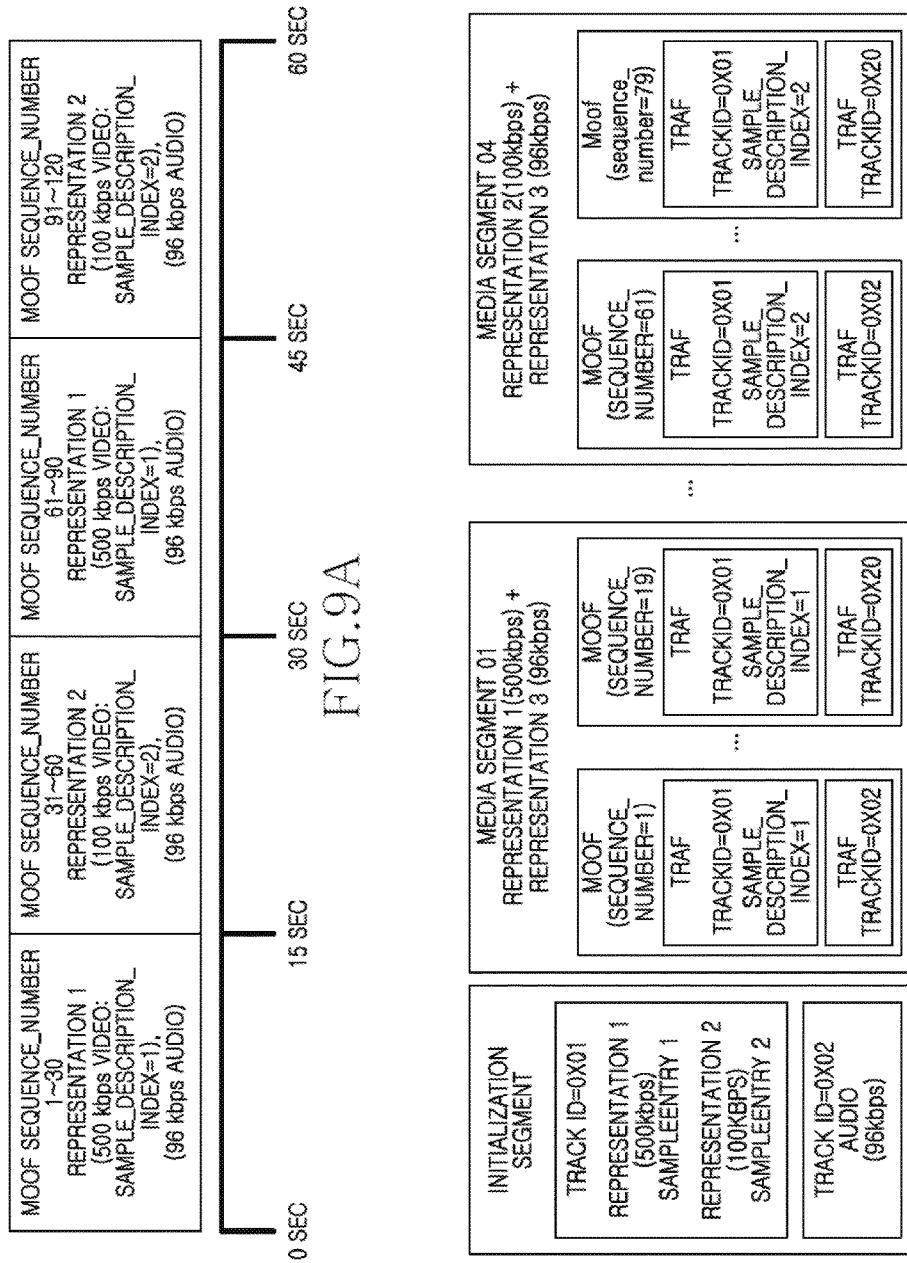
FIGS. 9A and 9B illustrate a receive stream and a concatenated media file in a multimedia streaming system according to an embodiment of the present disclosure.

FIGS. 9A and 9B illustrate a receive stream and a concatenated media file in a multimedia streaming system according to an embodiment of the present disclosure. Specifically, FIGS. 9A and 9B illustrate the receive stream and the concatenated media file, when the fragment includes both video and audio.

Referring to FIG. 9A, segments of the first representation including audio and video are received in 0-15 seconds, segments of the second representation including audio and video are received in 15-30 seconds, segments of the first representation including audio and video are received in 30-45 seconds, and segments of the second representation including audio and video are received in 45-60 seconds. When the received segments are concatenated and stored, as illustrated in FIG. 9A, the media file of FIG. 9B may be generated.

Figure 10A:
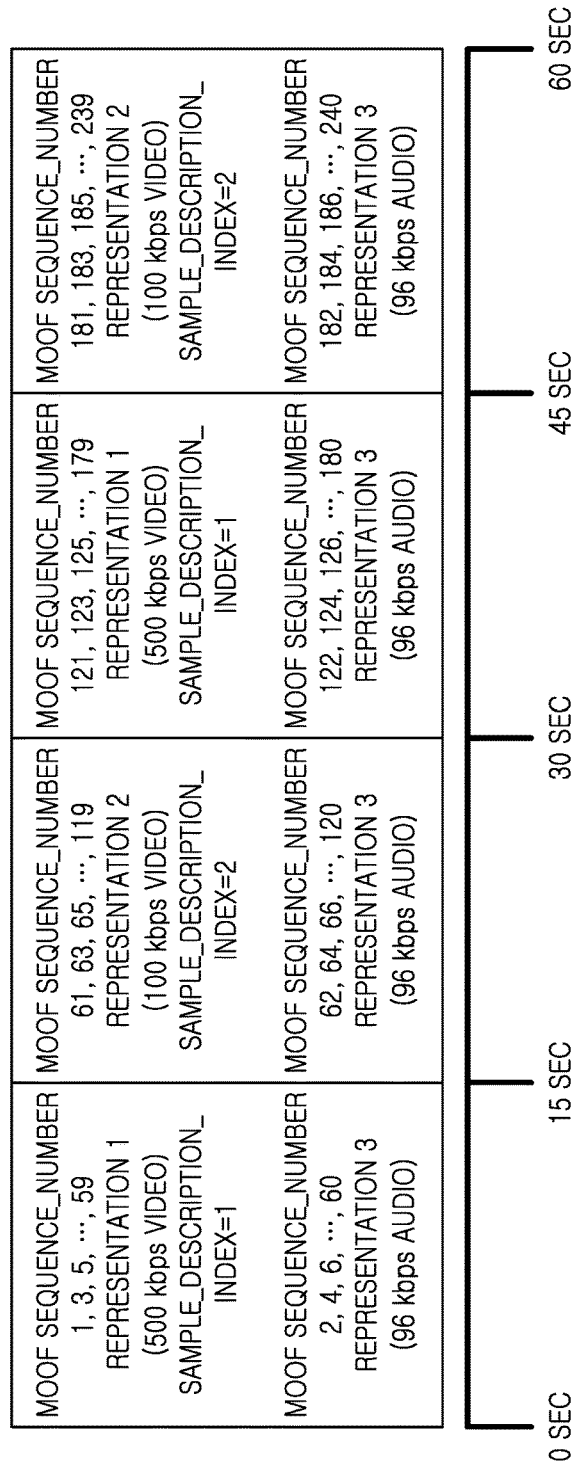
FIGS. 10A and 10B illustrate a receive stream and a concatenated media file in a multimedia streaming system according to an embodiment of the present disclosure.
Figure 10B:
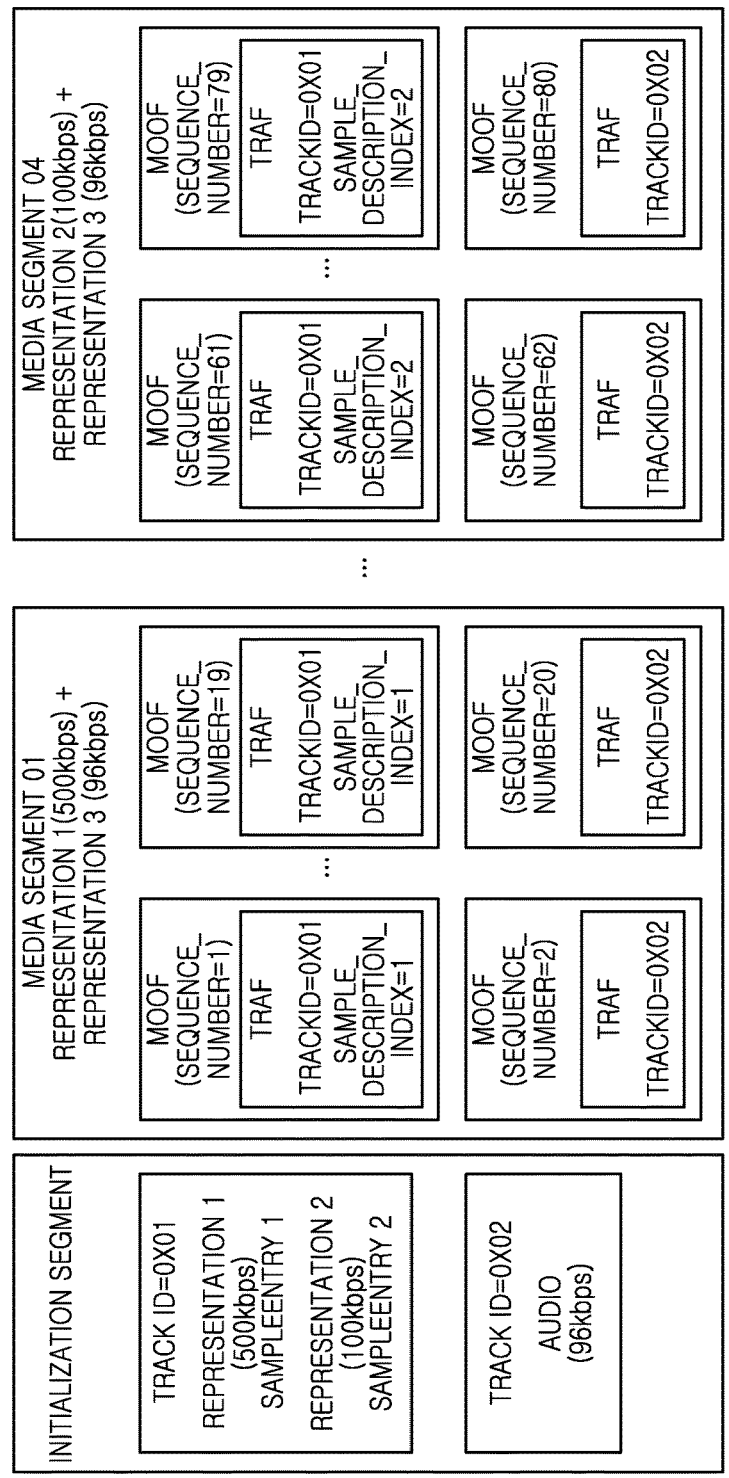

FIGS. 10A and 10B illustrate a receive stream and a concatenated media file in a multimedia streaming system according to an embodiment of the present disclosure. Specifically, FIGS. 10A and 10B illustrate the receive stream and the concatenated media file, when the fragment includes either video or audio and the fragment including the video is interleaved with the fragment including the audio.

Referring to FIG. 10A, segments of the first representation including video and segments of a third representation including audio are received in 0-15 seconds, segments of the second representation including video and segments of the third representation including audio are received in 15-30 seconds, segments of the first representation including video and segments of the third representation including audio are received in 30-45 seconds, and segments of the second representation including video and segments of the third representation including audio are received in 45-60 seconds. When the received segments are concatenated and stored as illustrated in FIG. 10A, the media file illustrated in FIG. 10B may be generated.

Figure 11A:
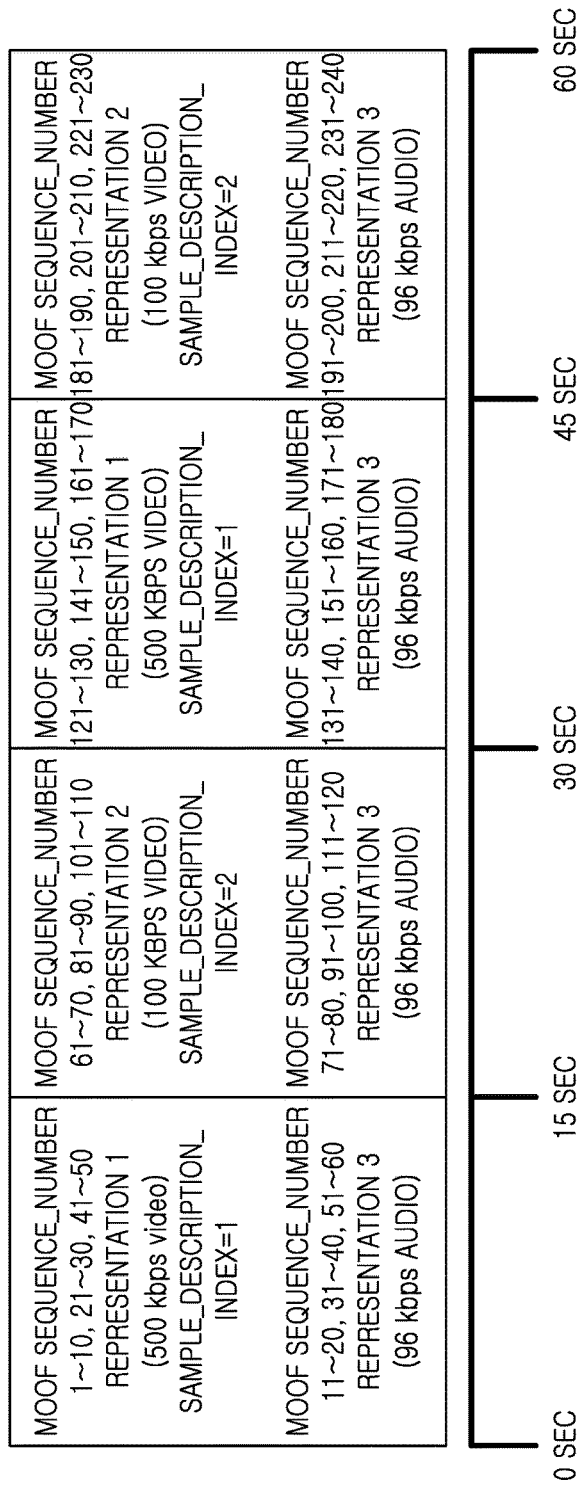
FIGS. 11A and 11B illustrate a receive stream and a concatenated media file in a multimedia streaming system according to an embodiment of the present disclosure.
Figure 11B:
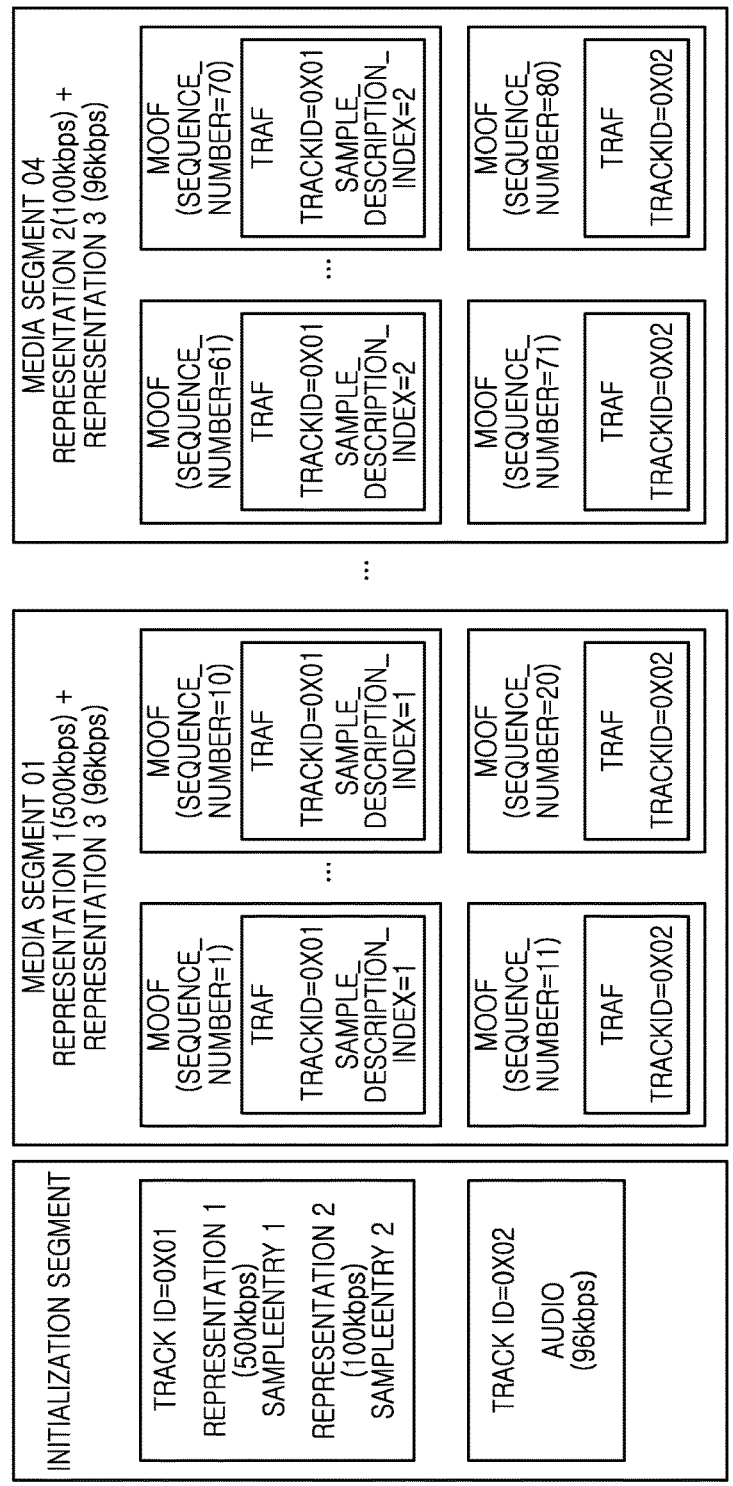

FIGS. 11A and 11B illustrate a receive stream and a concatenated media file in a multimedia streaming system according to an embodiment of the present disclosure. Specifically, FIGS. 11A and 11B illustrate the receive stream and the concatenated media file, when the fragment includes either video or audio and the fragment including the video is not interleaved with the fragment including the audio.

Referring to FIG. 11A, segments of the first representation including video and segments of the third representation including audio are received in 0-15 seconds, segments of the second representation including video and segments of the third representation including audio are received in 15-30 seconds, segments of the first representation including video and segments of the third representation including audio are received in 30-45 seconds, and segments of the second representation including video and segments of the third representation including audio are received in 45-60 seconds. When the received segments are concatenated and stored as illustrated in FIG. 11A, the media file illustrated in FIG. 11B may be generated.

In a multimedia streaming system according to the above-described embodiments of the present disclosure, a compatible flag indicates whether a legacy file player may play concatenated segments. When the segments are concatenated and stored, the segments are constituted to be played by the legacy file player. Therefore, a user may use the content easily at an intended time or using the legacy file player.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An apparatus for transmitting media content in a multimedia streaming system, the apparatus comprising:
a transceiver
configured to:
receive a request for the media content; and
transmit a plurality of segments regarding the media content,
wherein the plurality of segments comprises an initialization segment (IS) and a media segment (MS),
wherein the IS includes a moov box and a stsd box, wherein the stsd box includes sample description entries required to decode all representations within a representation group, and wherein each sample description entry in the stsd box corresponds to coding information of a media component in each of the representations,
wherein the MS includes a moof box including a sample description index and a mdat box including media data, and
wherein a value of the sample description index is an index of one of the sample description entries in the stsd box.

2. The apparatus of claim 1, wherein the transceiver is further configured to
transmit, to a client device, control information regarding the media content,
wherein the control information comprises information informing whether a concatenation of a plurality of segments results in a bitstream that conforms to a media format.

3. The apparatus of claim 2, wherein the information further informs whether the bitstream is playable by a player.

4. The apparatus of claim 1, wherein the plurality of segments includes track identifiers, and
wherein the track identifiers for a same media content component are identical for each of the representations.

5. The apparatus of claim 1, wherein the MS comprises at least one moof box,
wherein the at least one moof box uses movie-fragment relative addressing.

6. An apparatus for receiving a media content in a multimedia streaming system, the apparatus comprising:
a transceiver
configured to:
transmit a request for the media content; and
receive a plurality of segments regarding the media content,
wherein the plurality of segments comprises an initialization segment (IS) and a media segment (MS),
wherein the IS includes a moov box and a stsd box, wherein the stsd box includes sample description entries required to decode all representations within a representation group, and wherein each sample description entry in the stsd box corresponds to coding information of a media component in each of the representations,
wherein the MS includes a moof box including a sample description index and a mdat box including media data, and
wherein a value of the sample description index is an index of one of the sample description entries in the stsd box.

7. The apparatus of claim 6, wherein the transceiver is further configured to
receive control information regarding the media content,
wherein the control information comprises information informing whether a concatenation of a plurality of segments results in a bitstream that conforms to a media format.

8. The apparatus of claim 7, wherein the information further informs whether the bitstream is playable by a player.

9. The apparatus of claim 6, wherein the plurality of segments includes track identifiers, and
   wherein the track identifiers for a same media content component are identical for each of the representations.

10. The apparatus of claim 6, wherein the MS comprises at least one moof box,
    wherein the at least one moof box uses movie-fragment relative addressing.

* * * * *